United States Patent Office 3,223,541
Patented Dec. 14, 1965

3,223,541
PRODUCTION OF REFRACTORY
SILICA ARTICLES
John W. Lindenthal, Red Bank, N.J., assignor to Engelhard Industries, Inc., Newark, N.J., a corporation of Delaware
No Drawing. Filed Dec. 26, 1962, Ser. No. 247,386
11 Claims. (Cl. 106—69)

This invention relates to silica materials and more particularly to a method for the production of refractory silica articles, and treatment furnaces, plants or installations having a refractory lining of such silica articles.

Refractory siliceous articles, for instance blocks or monolithic forms, have been produced in the past from silica, e.g., quartz sand or quartzite by first grinding the material with water in the absence of a binder to form a mud. This mud is then allowed to "season" for one month or longer with the result it amalgamates, i.e., becomes sticky, while its water percentage diminishes to form a paste. The resulting paste is subjected to heating at high temperature to form the refractory material. While this process is satisfactory in certain respects, it is disadvantageous from the standpoint that it requires the prolonged time periods of a month or longer for "seasoning" of the mud.

Further, it is known in the art to produce refractory materials by admixing binding materials with quartz. However the presence of the binder has the undesirable and noxious result of reducing the refractoriness at times as much as from 50° to 100° C. or more.

In accordance with the present invention, a method is provided for producing refractory silica articles characterized by eliminating the prolonged "seasoning" period of the prior art process previously mentioned and further which avoids the necessity for binder materials. The method involves incorporating an ammonium salt capable of being substantially completely removed from the silica during the subsequent drying or firing into a liquid suspension of finely-divided silica particles, preferably of particle size predominately larger than one micron in size, thereby to flocculate or agglomerate the discrete silica particles to form a paste or mud. When refractory articles, for instance blocks, bricks, etc., are the desired products, the paste is then formed into the article of the desired shape, and the shape is fired to strengthen same. If a troweling mud is the desired product, the shaping and firing steps are unnecessary. The silica, which may be ground or milled to the finely-divided particle size, is either crystalline or vitreous silica, preferably the latter.

The refractory blocks, bricks or other shapes of this invention, for instance monolithic forms, when used for lining furnaces, installations, or plants for thermal treatment of materials in accordance with this invention, for instance furnaces for sintering, and installations or plants for thermal treatment of glass or metals, provide linings which resist and stand up well under very high temperatures as high as 1300° C. Further the shaped refractory articles of this invention, for instance the bricks and preferably when impregnated and coated with tar or pitch, can be used for lining ladles in the metallurgical industry for casting iron or steel, and as tapping nozzles for withdrawal of the molten metal from the ladles. Additionally the paste or mud produced by the invention can be utilized for repairing cracks in refractory linings of furnaces, etc. by troweling or other suitable manner.

Ammonium salts having the property previously disclosed herein of being substantially completely removed from the silica during the drying or firing are utilized to flocculate the discrete silica particles as they avoid introduction of non-volatile cations into the suspension or slurry. On the contrary alkali salts other than ammonium compounds, for instance $Na_2CO_3$, $K_2CO_3$ or $NaNO_3$ are unsatisfactory inasmuch as they introduce non-volatile cations into the slurry or suspension, and these cations are not removed during the drying and firing operations and are disadvantageous for the reasons they deleteriously effect the desirable properties of the resulting product, for instance by reducing its melting or softening temperature, and promoting its tendency to devitrify (crystallize). Exemplary of the ammonium salts, are ammonium carbonate, ammonium nitrate, ammonium formate, and ammonium acetate with ammonium carbonate and ammonium nitrate being preferred among the salts. The size of the silica particles from the grinding are preferably of finely-divided size predominately or a major portion of which have size above one micron, i.e. have diameters each greater than one micron. The following table of data shows the percentage of fused or vitreous silica particles within different micron ranges that flocculated upon addition of the ammonium salt, $NH_4NO_3$, to an aqueous suspension of such particles as well as the percentage of particles in the suspension in each size group which did not flocculate.

TABLE I

| Eq. Sph. Dia. ($\mu$) | Flocculated | Not Flocculated |
|---|---|---|
| >15 | 5.5 | 7 |
| 10 to 15 | 7.5 | 15 |
| 8 to 10 | 9 | 14.5 |
| 6 to 8 | 18.5 | 19 |
| 5 to 6 | 13.5 | 9 |
| 4 to 5 | 13.5 | 10 |
| 2 to 4 | 26.5 | 20 |
| <2 | 6 | 5 |

In Table I, the column heading "Eq. Sph. Dia. ($\mu$)" means equivalent spherical diameter in microns. In this column, the range "2 to 4" microns includes 2 microns up to but not including 4 microns; the range "4 to 5" microns includes 4 microns up to but not including 5 microns; the range "5 to 6" microns includes 5 microns up to but not including 6 microns; and the remaining size ranges have the same extent of coverage in their specific range. It will be noted from the foregoing table there is an appreciably greater percentage of silica particles of size in the 2 to 8 micron range that flocculate than in the 8 to 15 micron and larger size range. In the process of this invention, the especially preferred size of the vitreous silica particles is a percentage of silica particles in the 2 to 8 micron range greater than 50 percent and typically from about 65–75 percent, and in the 8 to 15 micron range of less than 25 percent and typically from about 16–23 percent. With crystalline silica, materially smaller size silica particles can be utilized. Particle size distributions were determined by the "Micromerograph" an instrument that disperses particles in nitrogen gas and determines their size in terms of settling rate in a column to a weighing pan at the bottom of the column.

The silica is preferably admixed with water prior to the grinding, with the weight ratio of silica to water being from about 1:1–5:1 respectively, more preferably from about 2:1–3:1 respectively. The grinding is done by a ball mill or by other suitable grinding apparatus known to the art.

The density of the product fired silica article of this invention can be controlled by controlling the specific gravity of the suspension or slip of silica particles prior to the addition of the ammonium salt flocculating agent or by the method of addition of the flocculating agent.

By starting with a silica suspension or slip of a high specific gravity, for instance a specific gravity of about 1.7–1.8, and adding the flocculating agent as a dry salt, higher density product silica articles are obtained. Product silica articles of lower density are produced by the process by the use of a silica suspension or slip of lower specific gravity, for instance a specific gravity of about 1.55–1.65, and obtained by increasing the liquid/solid ratio and by adding the ammonium salt as an aqueous solution.

The first additions of the ammonium salt to the silica suspension results in a suspension which appears to be truly thixotropic, i.e., it becomes fluid upon agitation but solid upon standing. This behavior appears to be reversible indefinitely, provided no evaporation occurs which would change the solid-liquid ratio. Further addition of the flocculating agent results in increasingly stiffer suspensions which lend themselves well to be troweled, worked by hand, or extruded.

The flocculating agent is added to the silica suspension in proportions, by weight, of from about 0.05–1 percent, preferably from about 0.1–0.5 percent, based on weight of $SiO_2$. The paste or mud resulting from the flocculation of the discrete silica particles can be formed into the desired shape articles, for instance by being cast in a mold. The paste or mud is also suitable as troweling paste for filling grooves and joints.

After the paste is formed into the desired shape article or ware, it is preferably allowed to dry and then removed from the mold and fired. The firing temperatures are typically from about 800° C.–1200° C.

The invention will be more fully understood by reference to the following examples. Parts and percentages are by weight unless otherwise stated.

*Example I*

A suspension or slip was prepared by grinding 220 parts of fused quartz to a particle size of 75 percent in the range of 2 to 8 microns in 100 parts of water. The resultant suspension had a specific gravity of 1.60. 3 parts of 10 percent ammonium carbonate aqueous solution was then added to the slip with the result flocculation of the discrete silica particles occurred to form a paste. This paste or mud was packed in a mold for forming bricks followed by drying of the cast. The dried cast was then removed followed by firing at temperature of about 1000° C. to obtain the product brick, which was well suited for use in forming the refractory lining of a furnace.

*Example II*

The procedure of Example I was repeated except that 8 parts of a 10 percent ammonium nitrate aqueous solution was added to the suspension of fused quartz particles with the result the discrete particles flocculated to form the paste or mud.

*Example III*

The procedure of Example I was repeated except that 7 parts of a 10 percent ammonium acetate aqueous solution was added to the aqueous suspension of fused quartz particles whereby flocculation of the discrete silica particles resulted to form the paste.

*Example IV*

320 parts of fused quartz was milled in 100 parts of water to a silica particle size of about 75 percent in the range of 2 to 8 microns. The resulting aqueous suspension or slip had a specific gravity of 1.71. 7 parts of a 10 percent ammonium nitrate aqueous solution was added to the suspension or slurry with the result that flocculation of the silica particles occurred to form a paste. The resulting paste, after packing in a mold for bricks, followed by drying, removal from the mold, and firing at a temperature of about 1000° C. produced a refractory silica brick well suited for use in forming the refractory lining of a furnace.

*Example V*

The procedure of Example IV was repeated except that 0.5 part of dry ammonium nitrate was added to the suspension. The resulting flocculating of the discrete silica particles produced a paste or mud which, after casting in the mold and being permitted to dry followed by removal from the mold and firing at temperatures of about 1000° C., produced a refractory silica brick especially suited for use in forming the refractory lining of a heating furnace.

Fired refractory articles produced in accordance with the invention had the following properties:

| Specimen | Bulk Density (gm./cc.) | Percent Water Absorption | Percent Apparent Porosity |
|---|---|---|---|
| 1 | 1.37 | 25.2 | 34.5 |
| 2 | 1.27 | 33.4 | 42.3 |
| 3 | 1.30 | 31.3 | 40.6 |
| 4 | 1.26 | 34.6 | 43.6 |

The figures of the above table were obtained according to ASTM Standard Test Method C373. Bulk density is the quotient obtained by dividing the dry weight of the fired article or specimen by its exterior volume including pores; percent water absorption is the relationship of the weight of water absorbed to the dry weight of the fired specimen, expressed in percent; and apparent porosity is the relationship of the volume of open pores of the fixed article or specimen to the external volume thereof, expressed in percent.

It will be obvious to those skilled in the art that many modifications may be made within the scope of the present invention without departing from the spirit thereof and this invention includes all such modifications.

What is claimed is:

1. A method for producing refractory silica articles, which comprises incorporating an ammonium salt capable of being substantially completely removed from the silica during the firing hereafter specified into a liquid suspension of finely-divided silica particles thereby to flocculate the discrete silica particles to form a paste, forming the paste into an article of the desired shape, and firing the article shape.

2. A method for producing refractory silica articles, which comprises incorporating an ammonium salt capable of being substantially completely removed from the silica during the firing hereafter specified into an aqueous suspension of finely-divided silica particles of particle size predominately larger than one micron in size, thereby to flocculate the discrete silica particles to form a paste, forming the paste into an article of the desired shape, and firing the article shape.

3. The method of claim 2 wherein the ammonium salt is selected from the group consisting of the carbonate, nitrate, formate and acetate of ammonium.

4. A method for producing refractory silica articles, which comprises grinding silica to a finely-divided particle size, incorporating an ammonium salt selected from the group consisting of the carbonate, nitrate, formate and acetate of ammonium into an aqueous suspension of the finely-divided silica particles thereby to flocculate the discrete silica particles to form a paste, the ammonium salt being incorporated into the suspension in amount, by weight, from about 0.05–1 percent based on weight of $SiO_2$, forming the paste into an article of the desired shape, and firing the article shape at a temperature from about 800° C.–1200° C.

5. A method for producing refractory silica articles, which comprises grinding vitreous silica in the presence of water to a finely-divided particle size predominately larger than one micron in size to form an aqueous suspension of the silica particles, adding an ammonium salt selected from the group consisting of the carbonate, nitrate, formate and acetate of ammonium to the suspension thereby to flocculate the discrete silica particles to form a paste, the ammonium salt being added to the suspension in amount, by weight, from about 0.05–1 percent based on weight of $SiO_2$, forming the paste into an article of the desired shape, and firing the article shape at a temperature of about 800° C.–1200° C. to impart strength thereto.

6. The method of claim 5 wherein the finely-divided silica particles from the grinding, prior to the addition of the ammonium salt, are of particle size such that more than 50 percent of the particles have size in the range of 2 to 8 microns and less than 25 percent of the particles have size in the range of 8 to 15 microns.

7. The method of claim 5 wherein the ammonium salt is ammonium carbonate.

8. The method of claim 5 wherein the ammonium salt is ammonium nitrate.

9. The method of claim 5 wherein the silica is fused quartz.

10. A method for producing a silica mud or paste, which comprises incorporating an ammonium salt capable of being substantially completely removed from the silica during drying of the product mud into an aqueous suspension of finely-divided silica particles, thereby to flocculate the discrete silica particles to form a mud.

11. A method for producing a trowelable silica mud or paste, which comprises incorporating an ammonium salt selected from the group consisting of the carbonate, nitrate, formate and acetate of ammonium into an aqueous suspension of finely-divided silica particles of particle size predominately larger than one micron in size, the ammonium salt being incorporated into the suspension in amount, by weight, from about 0.05–1 percent based on weight of $SiO_2$, thereby to flocculate the discrete silica particles to form the trowelable mud.

References Cited by the Examiner
UNITED STATES PATENTS

| | | | |
|---|---|---|---|
| 1,713,580 | 5/1929 | Williams | 106—69 |
| 2,973,278 | 2/1961 | Kadisch | 106—69 |

TOBIAS E. LEVOW, *Primary Examiner.*